United States Patent Office 3,052,697
Patented Sept. 4, 1962

3,052,697
18-NOR-HYDROCORTISONES AND PREPARATION THEREOF
Gaston Amiard, Noisy-le-Sec (Seine), and René Heymes, Romainville (Seine), France, assignors, by mesne assignments, to Roussel-UCLAF, S.A., Paris, France, a corporation of France
No Drawing. Filed Mar. 29, 1961, Ser. No. 99,039
Claims priority, application France Apr. 7, 1960
4 Claims. (Cl. 260—397.45)

The invention relates to novel derivatives of pregnene having the formula:

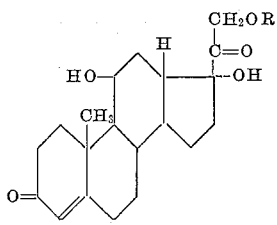

wherein R is selected from the group consisting of hydrogen and an acyl radical of an organic carboxylic acid having 1 to 18 carbon atoms. The invention also relates to a novel process for the production of said novel derivatives of pregnene and novel intermediates thereof.

The compounds of Formula I possess the glucocorticoid activity that other corticoid steroids such as cortisone and hydrocortisone possess, but have a lower mineralocorticoid activity than the other corticoid steroids. Mineralocorticoid activity is undesirable because it usually causes edema.

It is an object of the invention to obtain the novel 18-nor-pregnenes of the formula:

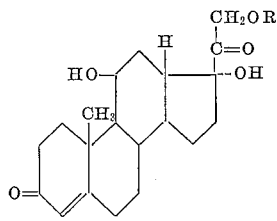

wherein R is selected from the group consisting of hydrogen and an acyl radical of an organic carboxylic acid having 1 to 18 carbon atoms.

It is another object of the invention to provide a novel process for the preparation of the novel 18-nor-pregnenes of Formula I.

It is a further object of the invention to obtain novel intermediates for the novel 18-nor-pregnenes, particularly:

(a) The 3,20-disemicarbazone of 18-nor-13$\beta$H$\Delta^4$-pregnene-17$\alpha$-ol-3,11,20-trione.

(b) The 3,20-disemicarbazone of 18-nor-13$\beta$H$\Delta^4$-pregnene-11$\beta$,17$\alpha$-diol-3,20-dione.

(c) 18-nor-13$\beta$H$\Delta^4$-pregnene-11$\beta$,17$\alpha$-diol-3,20-dione.

These and other objects and advantages of the invention will become obvious from the following detailed description.

The compounds of Formula I are prepared by reacting 18 - nor - 13$\beta$H$\Delta^4$ - pregnene - 17$\alpha$ - ol - 3,11,20 - trione with a semicarbazide salt such as the hydrohalide salt to form the 3,20-disemicarbazone of 18-nor-13$\beta$H$\Delta^4$-pregnene-17$\alpha$-ol-3,11,20-trione, reducing the latter with an alkali metal borohydride to form the 3,20-disemicarbazone of 18-nor-13$\beta$H$\Delta^4$-pregnene-11$\beta$,17$\alpha$-diol-3,20-dione, hydrolyzing the said 3,20-disemicarbazone to form 18-nor - 13$\beta$H$\Delta^4$ - pregnene - 11$\beta$,17$\alpha$ - diol - 3,20 - dione, hydroxylating the latter to form 18-nor-13$\beta$H$\Delta^4$-pregnene-11$\beta$,17$\alpha$,21-triol-3,20-dione. The said compound may be esterified by conventional procedures to form 21-acyloxy-18-nor-13$\beta$H$\Delta^4$-pregnene-11$\beta$,17$\alpha$-diol-3,20-dione.

The hydroxylation of 18 - nor - 13$\beta$H$\Delta^4$ - pregnene-11$\beta$,17$\alpha$-diol-3,20-dione may be done by microbiological means or chemical means. The biological method is preferably performed by the action of diastases secreted by *Colletotrichum lindemuthianum* (ATCC 12,611) as described in United States Patent 2,805,978 issued September 10, 1957.

The chemical hydroxylation is preferably performed by the formation of the 21-diiodo derivative, reacting the latter with an alkali metal salt of an organic acid having 1 to 18 carbon atoms to form 21-acyloxy-18-nor-13$\beta$H$\Delta^4$-pregnene-11$\beta$,17$\alpha$-diol-3,20-dione. The latter compound may then be saponified to form the free alcohol if desired.

A preferred process for the preparation of Formula I comprises reacting 18 - nor - 13$\beta$H$\Delta^4$ - pregnene - 17$\alpha$-ol-3,11,20-trione with 2 mols of semicarbazide hydrochloride in an aqueous organic solvent in the presence of an alkali metal acetate to form the 3,20-disemicarbazone of 18-nor-13$\beta$H$\Delta^4$-pregnene-17$\alpha$-ol-3,11,20-trione, reducing the latter with potassium borohydride in an inert organic solvent such as tetrahydrofuran to form the 3,20-disemicarbazone of 18-nor-13$\beta$H$\Delta^4$-pregnene-11$\beta$,17$\alpha$-diol-3,20-dione, hydrolyzing the said disemicarbazide with an acid such as pyruvic acid to form 18-nor-13$\beta$H$\Delta^4$-pregnene-11$\beta$,17$\alpha$-diol-3,20-dione and hydroxylating the latter to form 18 - nor - 13$\beta$H$\Delta^4$ - pregnene - 11$\beta$,17$\alpha$,21-diol-3,20-dione and recovering the latter. The process of the invention is outlined in Table I.

TABLE I

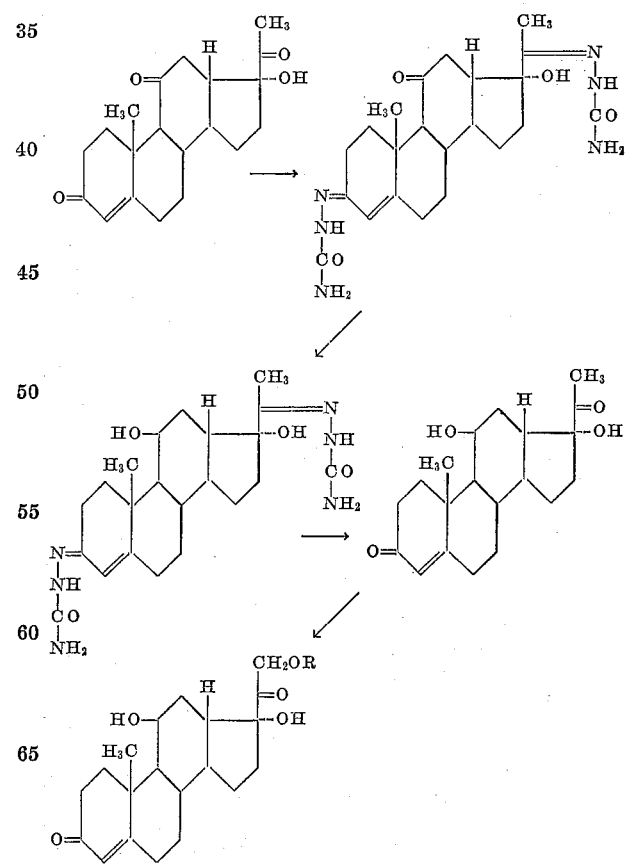

Wherein R is hydrogen or an acyl radical of an organic carboxylic acid having 1 to 18 carbon atoms.

The organic carboxylic acid having 1 to 18 carbon atoms may be aliphatic, cycloalkyl or aromatic. Suitable organic carboxylic acids are alkanoic and alkenoic acids, such as acetic acid, trimethylacetic acid, propionic acid, 4,4-dimethylpentanoic acid, 10-undecenoic acid; cycloalkyl alkanoic acids such as β-cyclopentyl propionic acid; arylalkanoic acids such as phenyl propionic acid; cycloalkanoic acids such as hexahydrobenzoic acid and hexahydroterephthalic acid; and phenyl carboxylic acids such as benzoic acid and 3,5-dinitrobenzoic acid.

In the following examples there are described several preferred embodiments to illustrate the invention. However, it should be understood that the invention is not intended to be limited to the specific embodiments. The melting points are instantaneous melting points determined on the Kofler block.

EXAMPLE I

*Preparation of 21-Acetoxy-18-Nor-13βHΔ⁴-Pregnene-11β, 17α-Diol-3,20-Dione*

*Step A.*—3.3 gm. of 18-nor-13βHΔ⁴-pregnene-17α-ol-3,11,20-trione having a melting point of 190° C. were prepared according to the method described by Velluz et al., Comptes Rendus de L'Academie des Sciences, Vol. 250 (1960), 371. The compound was dissolved in 25 cc. of warm alcohol and 5 cc. of water and the mixture was cooled. Then, 2.5 gm. of semicarbazide hydrochloride and 3.26 gm. of crystalline sodium acetate containing 3 mols of water in 20 cc. of water were added. The reaction mixture was agitated for 16 hours in total darkness. The crystalline product was vacuum filtered, washed with alcohol and with water, and dried at 60° C. A yield of 3.67 gm. of the 3,20-disemicarbazone of 18-nor-13βHΔ⁴-pregnene-17α-ol-3,11,20-trione was obtained. The product contained 18% of nitrogen, theoretical being 18.9%. By evaporation of the mother liquors and treatment with pyruvic acid, 0.3 gm. of the starting product was recovered.

The 3,20-disemicarbazone is not described in the literature.

*Step B.*—3.62 gm. of the 3,20-disemicarbazone produced in Step A were placed in suspension in 36 cc. of tetrahydrofuran. 1.2 gm. of potassium borohydride in 20 cc. of water were added under agitation and atmosphere of nitrogen, and the mixture was heated at 45° C. for 4 hours. After cooling, the excess potassium borohydride was destroyed by addition of acetic acid. The reaction mixture was alkalinized with ammonia and poured into water. The tetrahydrofuran was removed by distillation. The reaction mixture was iced and the precipitated product was vacuum filtered. This product was the 3,20-disemicarbazone of 18-nor-13βHΔ⁴-pregnene-11β-17α-diol-3,20-dione and was utilized without further purification for the rest of the synthesis.

This product is not described in the literature.

*Step C.*—3 cc. of pyruvic acid and 3 cc. of water were added to the 3,20-disemicarbazone produced in Step B above and the reaction mixture was allowed to stand under an atmosphere of nitrogen at 40° C. for one night. The next day 20 cc. of water were added to the crystalline mass which had formed. The mixture was disintegrated, iced, vacuum filtered and washed with water. The vacuum filtered product was triturated with a dilute sodium carbonate solution, washed with water and dried. The product was recrystallized from absolute alcohol and 1.82 gm. of 18-nor-13βHΔ⁴-pregnene-11β,17α-diol, 3,20-dione, having a melting point of 202° C. and a specific rotation $[\alpha]_D^{20} = +68°$ ($c=0.5\%$ in acetone), were recovered (being a yield of 54% with reference to the starting product of Step A). The product was soluble in alcohol and acetone, slightly soluble in benzene and chloroform and very slightly soluble in ether, insoluble in water and in dilute aqueous acids and alkalis.

*Analysis.*—$C_{20}H_{28}C_4$; molecular weight=332.42. Calculated: C, 72.26%; H, 8.49%. Found: C, 72.3%; H, 8.5%.

The product is not described in the literature.

*Step D.*—The *Colletotrichum lindemuthianum* (ATCC 12,611) was cultivated for a period of 10 days at 24° C. on a gelatin media containing 2% of saccharose and 20% of potato extract. The spores were collected in distilled water. The suspension obtained was used to sterilely inoculate a 1-liter Erlenmeyer flask containing 100 cc. of a media composed as follows:

| | Grams |
|---|---|
| Pure glucose | 10 |
| Malt extract | 5 |
| Soybean meal | 10 |
| Sodium chloride | 5 |
| Dry corn steep | 5 |
| Calcium carbonate | 1 |
| Tap water sufficient to make 1000 cc. | |

The pH of the media was previously adjusted to 6.8 to 7.0 by potassium hydroxide solution and sterilized by heating for 30 minutes at a temperature of 120° C. After 5 hours of culturing at a temperature of 24° C. on a shaking apparatus (85 strokes per minute, 8 cm. in length), 10 cc. of an acetonic solution containing 1% of 18-nor-13βHΔ⁴-pregnene-11β,17α-diol-3,20-dione were added to 1000 cc. of culture. A renewed incubation of 24 hours formed 18-nor-13βHΔ⁴-pregnene-11β,17α,21-triol-3,20-dione.

After the broth was filtered, the mycelium was washed two times with 5 cc. of acetone and added to the acetonic filtrate liquor. The mycelium was extracted twice with 50 cc. aliquots of chloroform and the preceding filtrate was extracted with these 100 cc. of chloroform, then twice more with 20 cc. of chloroform. The chloroformic extracts were washed first with aqueous sodium bicarbonate solution, then with water. The extracts were dried over magnesium sulfate and evaporated to dryness under vacuum. The residue consisted of 18-nor-13βHΔ⁴-pregnene-11β,17α,21-triol-3,20-dione.

This product is not described in the literature.

The product obtained was taken up in 5 cc. of pyridine, and after 5 cc of acetic anhydride were added, the mixture was allowed to react at room temperature. Other esterification agents such as acid esters or acid halides could be used instead of the anhydride. The mixture was then poured into 100 cc. of iced water and allowed to stand overnight at room temperature. Thereafter, it was extracted with chloroform. The extracts were washed with sulfuric acid, with sodium bicarbonate, with water, dried and evaporated to dryness under vacuum. The residue consisting of 21-acetoxy-18-nor-13βHΔ⁴-pregnene-11β,17α-diol-3,20-dione was recrystallized from acetone and had a melting point of 222° to 224° C. and a specific rotation $[\alpha]_D^{20} = +115°$ ($c=0.5\%$ in dioxane). The product was present in the form of prismatic crystals being assembled in stars or in crosses.

*Analysis.*—$C_{22}H_{30}O_6$; molecular weight=390.46. Calculated: C, 67.67%; H, 7.74%. Found: C, 67.9%; H, 7.8%.

The product was soluble in alcohol and aqueous acetone, insoluble in ether, water, dilute acids and alkalis.

It is not described in the literature.

EXAMPLE II

*Preparation of 21-Acetoxy-18-Nor-13βHΔ⁴-Pregnene-11β,17α-Diol-3,20-Dione*

1.8 gm. of the compound prepared in Step C of Example I were dissolved in 10 cc. of tetrahydrofuran and 15 cc. of methanol containing 10% calcium chloride. The solution was cooled to −15° C. and 3.6 gm. of pulverized quick lime and 1.53 gm. of iodine were added. The reaction mixture was agitated in a closed vessel for a period of a half hour until it decolorized. It was vacuum filtered and a solution of 21-diiodo-18-nor- 13βHΔ⁴-pregnene-11β,17α-diol-3,20-dione was obtained which was directly utilizable for acetyloxylation.

This compound is not described in the literature.

The solution of the 21-diiodo derivative was introduced into a suspension of 7.2 gm. of melted potassium acetate in 100 cc. of acetone acidified by several drops of acetic acid and raised slowly to reflux temperature under agitation and an atmosphere of nitrogen. After heating for a period of 75 minutes, it was cooled and 50 cc. of water were added and the solvents were removed by distillation. The residue was purified by treatment at elevated temperatures with zinc and acetic acid in aqueous acetone. 21 - acetoxy - 18 - nor - 13βHΔ⁴ - pregnene - 11β,17α-diol-3,20-dione melting at 224° C. was recovered and was identical to that described in Example I.

Various modifications of the process of the present invention may be made without departing from the spirit or scope thereof, and it is to be understood that the invention be limited only as defined in the appended claims.

We claim:

1. The 3,20-disemicarbazone of 18-nor-13βHΔ⁴-pregnene-17α-ol-3,11,20-trione.

2. The 3,20-disemicarbazone of 18-nor-13βHΔ⁴-pregnene-11β,17α-diol-3,20-dione.

3. A process for the preparation of a compound having the formula:

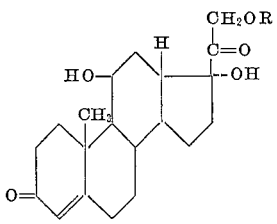

wherein R is selected from the group consisting of hydrogen and an acyl radical of an organic carboxylic acid having 1 to 18 carbon atoms which comprises reacting 18-nor-13βHΔ⁴-pregnene-17α-ol-3,11,20-trione with semicarbazide hydrochloride in the presence of an alkali metal acetate to form the 3,20-disemicarbazone of 18-nor-13βHΔ⁴-pregnene-17α-ol-3,11,20-trione, reducing the latter with potassium borohydride in tetrahydrofuran to form the 3,20-disemicarbazone of 18-nor-13βHΔ⁴-pregnene-11β,17α-diol-3,20-dione, hydrolyzing the said disemicarbazone with pyruvic acid to form 18-nor-13βHΔ⁴-pregnene-11β,17α-diol-3,20-dione, reacting the said product with iodine in the presence of calcium chloride and calcium oxide to form 21-diiodo-18-nor-13βHΔ⁴-pregnene-11β,17α-diol-3,20-dione, reacting said diiodo compound with an alkali metal salt of an organic carboxylic acid having 1 to 18 carbon atoms to form 21-acyloxy-18-nor-13βHΔ⁴-pregnene-11β,17α-diol-3,20-dione and recovering the compound of the above formula.

4. A process for the preparation of a compound having the formula

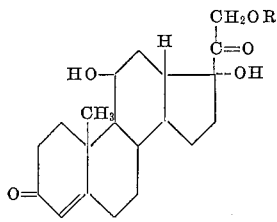

wherein R is selected from the group consisting of hydrogen and an acyl radical of an organic carboxylic acid having 1 to 18 carbon atoms which comprises reacting 18-nor-13βH-Δ⁴-pregnene-17α-ol-3,11,20-trione with a semicarbazide to form the 3,20-disemicarbazone of 18-nor-13βH-Δ⁴-pregnene-17α-ol-3,11,20-trione, reducing the latter with an alkali metal borohydride to form the 3,20-disemicarbazone of 18-nor-13βH-Δ⁴-pregnene-11β,17α-diol-3,20-dione, hydrolyzing the said disemicarbazone to form 18-nor-13βH-Δ⁴-pregnene-11β,17α-diol-3,20-dione, reacting the latter with iodine in the presence of calcium chloride and calcium oxide to form 21-diiodo-18-nor-13βH-Δ⁴-pregnene-11β,17α-diol-3,20-dione, reacting the latter with an alkali metal salt of an organic carboxylic acid having 1 to 18 carbon atoms to form 21-acyloxy-18-nor-13βH-Δ⁴-pregnene-11β,17α-diol-3,20-dione and recovering the desired product.

References Cited in the file of this patent

UNITED STATES PATENTS 2,844,513　　Wettstein et al. _____ July 22, 1958
2,979,518　　Van Dorp et al. _____ Apr. 11, 1961

OTHER REFERENCES

Oliveto et al.: J.A.C.S., 78, 1736–1738 (1956).
Taub et al.: J.A.C.S., 78, 2912–2913 (1956).
Loewenthal: Tetrahedron, 6, 269–303 (June 1959), (page 294 relied upon).